(12) United States Patent
Benhase et al.

(10) Patent No.: US 7,490,205 B2
(45) Date of Patent: Feb. 10, 2009

(54) METHOD FOR PROVIDING A TRIAD COPY OF STORAGE DATA

(75) Inventors: Michael T. Benhase, Tucson, AZ (US); Michael H. Hartung, Tucson, AZ (US); Yu-Cheng Hsu, Tucson, AZ (US); Carl E. Jones, Tucson, AZ (US); William G. Verdoorn, Jr., Rochester, MN (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 11/079,791

(22) Filed: Mar. 14, 2005

(65) Prior Publication Data
US 2006/0203718 A1   Sep. 14, 2006

(51) Int. Cl.
*G06F 12/00* (2006.01)

(52) U.S. Cl. .................................................... 711/162
(58) Field of Classification Search .................. None
See application file for complete search history.

(56) References Cited

U.S. PATENT DOCUMENTS

| | | | |
|---|---|---|---|
| 6,363,462 B1 * | 3/2002 | Bergsten ..................... | 711/162 |
| 6,986,008 B2 * | 1/2006 | Colvig et al. ............... | 711/162 |
| 7,165,141 B2 * | 1/2007 | Cochran et al. ............. | 711/114 |
| 7,296,179 B2 * | 11/2007 | Chu et al. ...................... | 714/6 |
| 7,305,529 B1 * | 12/2007 | Kekre et al. ................. | 711/162 |
| 2005/0160242 A1 * | 7/2005 | Griffin et al. ................ | 711/162 |

* cited by examiner

*Primary Examiner*—Hiep T Nguyen
(74) *Attorney, Agent, or Firm*—William K. Konrad; Konrad Raynes & Victor LLP

(57) ABSTRACT

A method for maintaining data is provided that includes receiving primary data at a first node, receiving mirrored data from a second and third node at the first node, and mirroring data received at the first node to a second and third node.

7 Claims, 5 Drawing Sheets

METHOD FOR PROVIDING A TRIAD COPY OF STORAGE DATA

BACKGROUND OF THE INVENTION

1. Field of the Invention

This disclosure relates in general to improving data reliability using multiple node clusters, and more particularly to a method, apparatus and program storage device for providing a triad copy of storage data in multiple node clusters.

2. Description of Related Art.

Computer architectures often have a plurality of logical sites that perform various functions. One or more logical sites, for instance, include a processor, memory, input/output devices, and the communication channels that connect them. Information is typically stored in a memory. This information can be accessed by other parts of the system. During normal operations, memory provides instructions and data to the processor, and at other times the memory is the source or destination of data transferred by I/O devices.

Input/output (I/O) devices transfer information between at least one internal component and the external universe without altering the information. I/O devices can be secondary memories, for example disks and tapes, or devices used to communicate directly with users, such as video displays, keyboards, touch screens, etc.

The processor executes a program by performing arithmetic and logical operations on data. Modern high performance systems, such as vector processors and parallel processors, often have more than one processor. Systems with only one processor are serial processors, or, especially among computational scientists, scalar processors. The communication channels that tie the system together can either be simple links that connect two devices or more complex switches that interconnect several components and allow any two of them to communicate at a given point in time.

A parallel computer is a collection of processors that cooperate and communicate to solve large problems fast. Parallel computer architectures extend traditional computer architecture with a communication architecture and provide abstractions at the hardware/software interface and organizational structure to realize abstraction efficiently. Parallel computing involves the simultaneous execution of the same task (split up and specially adapted) on multiple processors in order to obtain faster results.

There currently exist several hardware implementations for parallel computing systems, including but not necessarily limited to a shared-memory approach and a shared-disk approach. In the shared-memory approach, processors are connected to common memory resources. All inter-processor communication can be achieved through the use of shared memory. This is one of the most common architectures used by systems vendors. However, memory bus bandwidth can limit the scalability of systems with this type of architecture.

In a shared-disk approach, processors have their own local memory, but are connected to common disk storage resources; inter-processor communication is achieved through the use of messages and file lock synchronization. However, I/O channel bandwidth can limit the scalability of systems with this type of architecture.

A computer cluster is a group of connected computers that work together as a parallel computer. All cluster implementations attempt to eliminate single points of failure. Moreover, clustering is used for parallel processing, load balancing and fault tolerance and is a popular strategy for implementing parallel processing applications because it enables companies to leverage the investment already made in PCs and workstations. In addition, it's relatively easy to add new CPUs simply by adding a new PC to the network. A "clustered" computer system can thus be defined as a collection of computer resources having some redundant elements. These redundant elements provide flexibility for load balancing among the elements, or for failover from one element to another, should one of the elements fail. From the viewpoint of users outside the cluster, these load-balancing or failover operations are ideally transparent. For example, a mail server associated with a given Local Area Network (LAN) might be implemented as a cluster, with several mail servers coupled together to provide uninterrupted mail service by utilizing redundant computing resources to handle load variations for server failures.

Within a cluster, the likelihood of a node failure increases with the number of nodes. Furthermore, there are a number of different types of failures that can result in failure of a single node. Examples of failures that can result in failure of a single node include processor failure at a node, a non-volatile storage device or controller for such a device failure at a node, a software crash occurring at a node or a communication failure occurrence that results in all other nodes losing communication with a node. In order to provide high availability (i.e., continued operation) even in the presence of a node failure, information is commonly replicated at more than one node. For example, storage servers can be viewed as a specialized parallel computer, which is optimized to accept requests from clients who want to read or write data. The specialized parallel computer can be thought of as 2 nodes, or controllers, closely coupled, each connected to clients or a SAN. The two nodes communicate over some communication network and can mirror write data, check to see if requests are cached and use each other as a failover partner when serious errors occur. Thus, in the event of a failure of one node, the information stored at the compromised node can be obtained at the node, which has not failed.

It is common for each controller to handle even or odd logical unit numbers (LUNs) and/or even or odd count key data (CKD) volumes. When a customer writes a sector or block in the storage system, the storage system will make a copy on both nodes. These nodes may be battery backed up by some mechanism and so the data is protected from a power outage and/or a failure of one of the nodes. However, if a user needs to update firmware on one controller of a two node system, leaving only one node running, the possibility of an outage is present if the node left running experiences failure. Similarly, if one node of a two node system experiences failure, resulting in single node operation, the possibility of an outage is increased for the node left running.

"Pure" or symmetric cluster application architecture uses a "pure" cluster model where every node is homogeneous and there is no static or dynamic partitioning of the application resource or data space. In other words, every node can process any request from a client of the clustered application. This architecture, along with a load balancing feature, has intrinsic fast-recovery characteristics because application recovery is bounded only by cluster recovery with implied recovery of locks held by the failed node. Although symmetric cluster application architectures have good characteristics, symmetric cluster application architectures involve distributed lock management requirements that can increase the complexity of the solution and can also affect scalability of the architecture.

It can be seen that there is a need for a method, apparatus and program storage device for extending node clusters in order to increase data reliability within a storage server environment.

SUMMARY OF THE INVENTION

To overcome the limitations described above, and to overcome other limitations that will become apparent upon reading and understanding the present specification, the present invention discloses a method, apparatus and program storage device for improving data reliability.

The present invention provides a method, apparatus and program storage device for increasing data reliability in a storage system by providing a mechanism for writing data in triplet among at least three nodes. Data is stored in a plurality of nodes and data reliability within the storage server environment is increase by allowing nodes to act as a primary, redundancy, and backup thereby allowing a correctly functioning system to spread the workload over all nodes.

A program storage device is provided. The program storage device tangibly embodies one or more programs of instructions executable by the computer to perform operations for maintaining data reliability, the operations including receiving primary data, redundancy partner data and backup partner data and mirroring a copy of the primary data to a redundancy partner node and to a backup partner node.

In another embodiment of the present invention, a storage system is provided. The storage system includes a first node for receiving primary data, the first node being configured for sending a mirror copy of the primary data to a redundancy partner node and to a backup partner node.

In another embodiment of the present invention, a method for increasing data reliability in a storage system is provided. The method includes receiving primary data, redundancy partner data and backup partner data and mirroring a copy of the primary data to a redundancy partner node and to a backup partner node.

In another embodiment of the present invention, a processing system is provided. The processing system includes means for receiving primary data and means for sending a mirrored copy of the primary data to a redundancy partner node and to a backup partner node.

In another embodiment of the present invention, a processing system is provided. The processing system includes means for receiving primary data and means for sending a mirror copy of the primary data to a redundancy partner means and to a backup partner means.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for increasing data reliability in a storage system by providing a mechanism for writing data in triplet among at least three nodes. Data is stored in a plurality of nodes and data reliability within the storage server environment is increase by allowing nodes to act as a primary, redundancy, and backup thereby allowing a correctly functioning system to spread the workload over all nodes.

Figure 1:
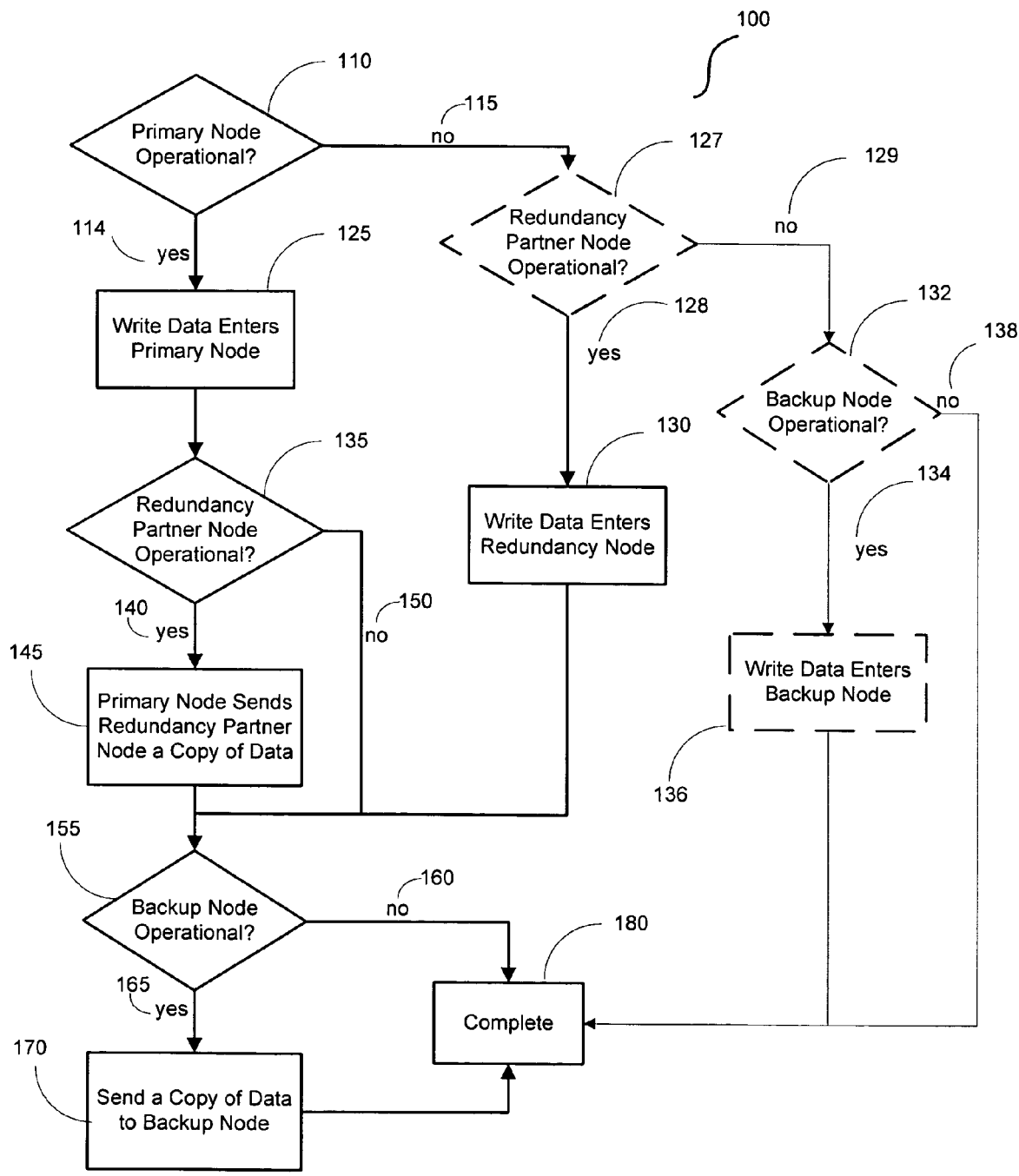
FIG. 1 is a flowchart of a method for increasing data reliability in storage systems in accordance with an embodiment of the present invention.

FIG. 1 is a flowchart of a method 100 for increasing data reliability in storage systems in accordance with an embodiment of the present invention. According to FIG. 1, a determination 110 is made as to whether a primary node is operational. When operational 114, data is entered into a primary node 125. A determination is then made as to whether a redundancy node is operational 135. When a redundancy node is operational 140, a primary node sends a redundancy partner node a copy of data 145 and a determination is made as to whether a backup node is operational 155. When the backup node is operational 165, a copy of data is sent to the backup node 170 and the process reaches completion 180. When the backup node is not operational 160 the process reaches completion 180. When a redundancy node is not operational 150, the determination of whether the backup node is operational 155. Thus, regardless of whether the redundancy node is operational, a determination 155 is made as to whether the backup node is operational.

In the example above data is initially handled by the primary node. In another embodiment of the invention, write data is received at a redundant node or at a backup node. When the write request enters the redundant node, a copy is sent to the primary node and to the backup node when operational. Similarly, when the write request enters the backup node, a copy is sent to the primary node and to the redundant node, provided the nodes are operational.

When the primary node is not operational 115, an optional process of determining the operational status of redundancy partner nodes and backup nodes may be performed. If the optional process is not implemented or used, then write data is provided to a redundancy node 130 when the primary node is not operational 115. When the optional process is used and the primary node is not operational 115, a determination of whether a redundancy partner node is operational 127. If the redundancy partner node is operational 128, then write data is provided to a redundancy node 130. If the redundancy partner node is not operational 129, then a determination is made whether a backup node is operational 132. If a backup node is operational 134, then write data is provided to an operational backup node 136. If a backup node is not operational 138, then the process reaches completion 180.

Each node may act in all three capacities, primary, redundancy, and backup, therefore allowing a correctly functioning system to spread the workload over all N nodes. Furthermore, in accordance with an embodiment of the invention, a single node can operate as a redundancy node for two nodes. In addition, each node may have an upper interface for connecting with servers and a lower interface for connecting with disk fabric. Each of the nodes being capable of acting as a primary, redundancy and backup node minimizes the cost of the redundancy and allows for performance enhancements as nodes are added. Thus, copies primary data may be mirrored to a redundancy partner node and to a backup partner node.

Nodes used in accordance with an embodiment of the present invention can store primary data and additional copies of write data from other nodes allowing data to be stored, e.g., in triplet in a storage system. Upon failure of one node, failover would take place at a functioning secondary node enabling work intended for the primary node to be performed by the secondary node.

In one example, primary data stored on the first node is mirrored to two nodes, and data from two nodes is mirrored to the first node. Again, a reciprocal relationship can be present between three storage nodes, but is not required. Alternatively, in a non-reciprocal relationship a first node can mirror data to a second and third node, while the second and third node containing first node data mirror their respective primary data to a fourth and fifth node. When one node fails, redundancy in stored data remains thereby allowing access to data via mirrored copies. For example, if the first node fails, the second and third node having mirrored first node data retains copies of the first node's primary data allowing access to first node data copied to the second and third node. Establishing two backups per node enables redundancy even in a node failure situation. For systems with greater than three nodes, some nodes in a failure situation will continue to have two backup partners while some will only have one.

Figure 2:
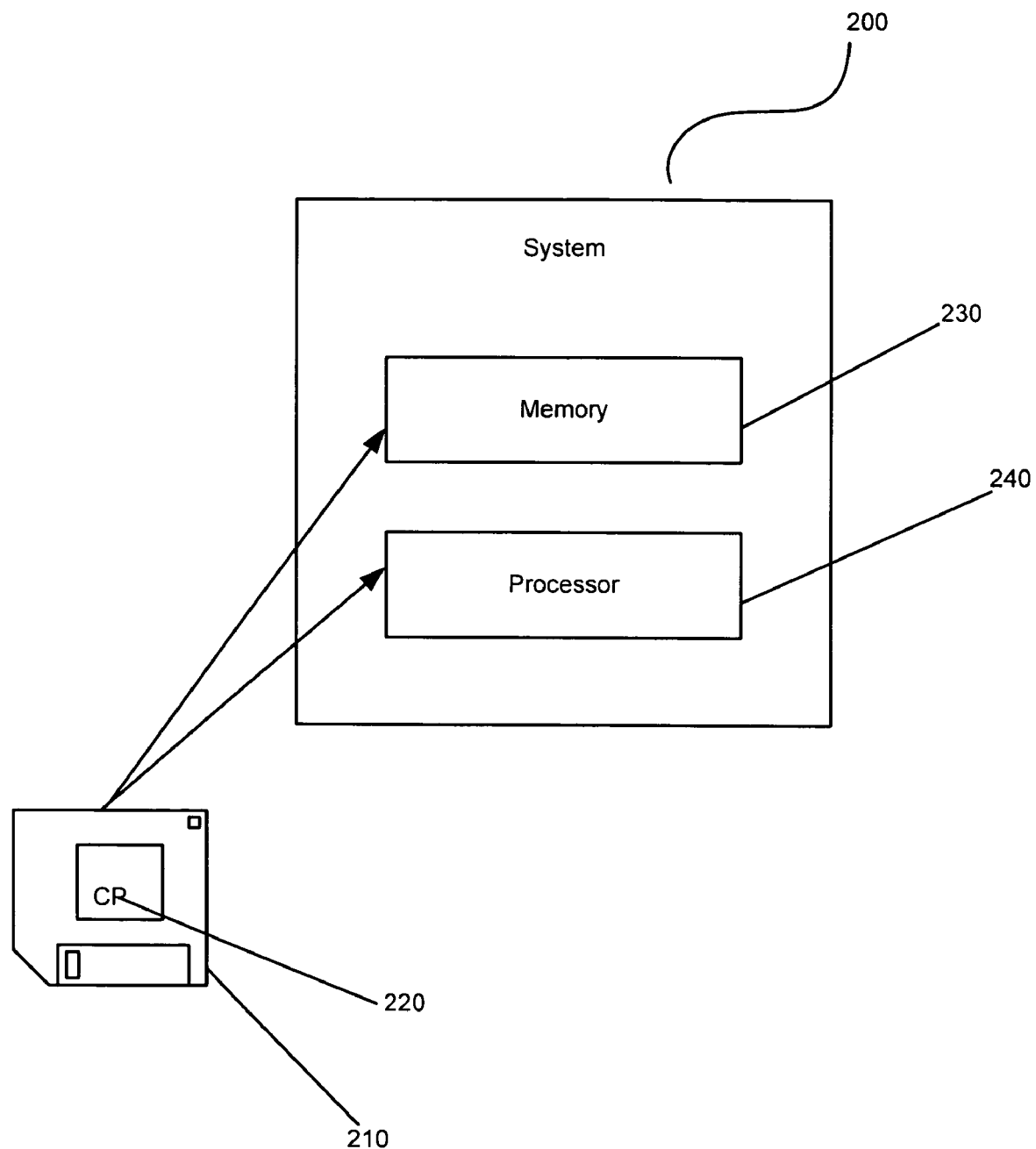
FIG. 2 illustrates a system according to the present invention, wherein the process illustrated in FIG. 1 may be tangibly embodied in a computer-readable medium or carrier, e.g. one or more of the fixed and/or removable data storage devices or other data storage or data communications devices.

FIG. 2 illustrates a system 200 according to the present invention, wherein the process illustrated in FIG. 1 may be tangibly embodied in a computer-readable medium or carrier, e.g. one or more of the fixed and/or removable data storage devices 210 or other data storage or data communications devices. A computer program 220 expressing the processes embodied on the removable data storage devices 210 may be loaded into the memory 230 or into the system 200, e.g., in a processor 240, to configure the system 200 of FIG. 2 for execution. The computer program 220 comprise instructions which, when read and executed by the system 200 of FIG. 2, causes the system 200 to perform the steps necessary to execute the steps or elements of the present invention.

Figure 3:
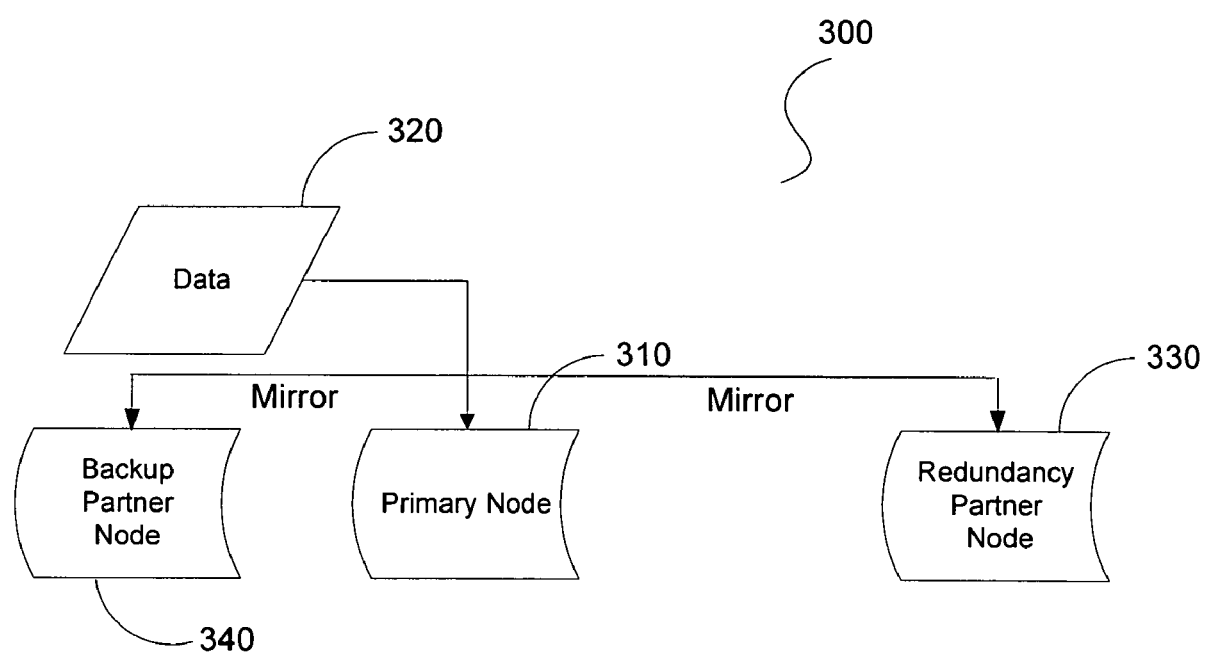
FIG. 3 is a block diagram of a primary node and its relation to a block of data, a redundancy partner node and a backup partner node in accordance with an embodiment of the present invention.

FIG. 3 is a block diagram of a primary node 310 and its relation to a block of data 320, a redundancy partner node 330 and a backup partner node 340, in accordance with an embodiment of the present invention. A node is a primary node 310 when data that is written to it is data 320 initially written to the node from sources other than a redundancy partner node 330 or a backup partner node 340. Data 320 can originate from devices such as a mainframe, a server cluster or a personal computer.

A first copy of data 320 is written to primary node 310. Data 320 is cached and is subsequently mirrored to redundancy partner node 330 and backup partner node 340. If, however, primary node 310 becomes unavailable, the data 320 originally written to node 310 continues to be available on redundancy partner node 330 and backup partner node 340. If primary node 310 data is mirrored to only one node before primary node 310 becoming unavailable, e.g., if the primary node 310 has mirrored to the redundancy partner node 330 and not the backup partner node 340, then redundancy partner node 330 mirrors the primary node 310 primary data to backup partner node 340. If both primary node 310 and redundancy partner node 330 fail, for example, one copy of data remains available on backup partner node 340. If the backup partner node 340 fails instead, redundancy remains in redundancy partner node 330 and/or primary node 310.

Thus, data reliability is improved over cluster systems having only single redundancy. The present invention further improves data reliability over cluster systems having N redundancy, where N is the number of nodes in a computer system, because less time and space is required in order to complete redundancy operations.

Figure 4A:
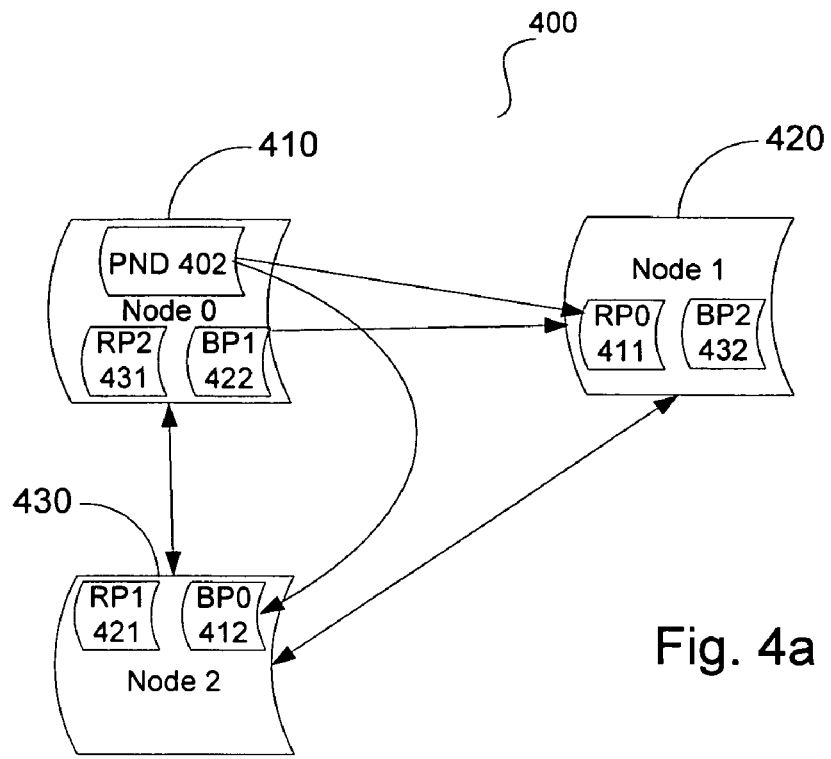
FIG. 4a is an illustration of a three-node system in accordance with an embodiment of the present invention.

FIG. 4a is an illustration of a three-node system 400 in accordance with an embodiment of the present invention. Nodes 0 410, 1 420 and 2 430 each can store data written to the nodes from an external source, for example, and can store two copies of mirrored data. Accordingly, in FIG. 4a, node 0 410 may serve as a primary node for data initially written to the node system, as a redundancy partner node for node 2 430 by storing mirrored data RP2 431, and as a backup partner node for node 1 420 by storing mirrored data BP1 422.

Similarly, nodes 1 420 and 2 430 serve as a primary node when initially written to, and each serves as a redundancy partner node and a backup partner node when mirrored to. Node 1 420 serves as a redundancy partner node for node 0 410 by storing mirrored data RP0 411, and node 2 430 serves as a redundancy partner node for node 1 420 by storing mirrored data RP1 421. Node 1 420 serves as a backup partner node for node 2 by storing mirrored data BP2 432, and node 2 430 serves as a backup partner node for node 0 by storing mirrored data BP0 412.

When a write to node 0 410 takes place, hardware and firmware on that node can check to see which logical unit number (LUN) is being written. The LUN number is taken and a Modulo N operation is performed, where N is the number of nodes in the system. The result identifies the primary node. Thus, if a client writes LUN 9 to node 0 in a 3 node system, node 0 is the primary node. Primary Node Data 402 is provided to node 0, which would then be mirrored to the redundancy partner node at node 1 420, as RP0 411, and to the node 0 backup partner node at node 2 430, as BP0 412. Thus, if an update write comes from a server to any of the three nodes, it would be updated on the node in which it arrived and then forwarded to the other 2 nodes.

Figure 4B:
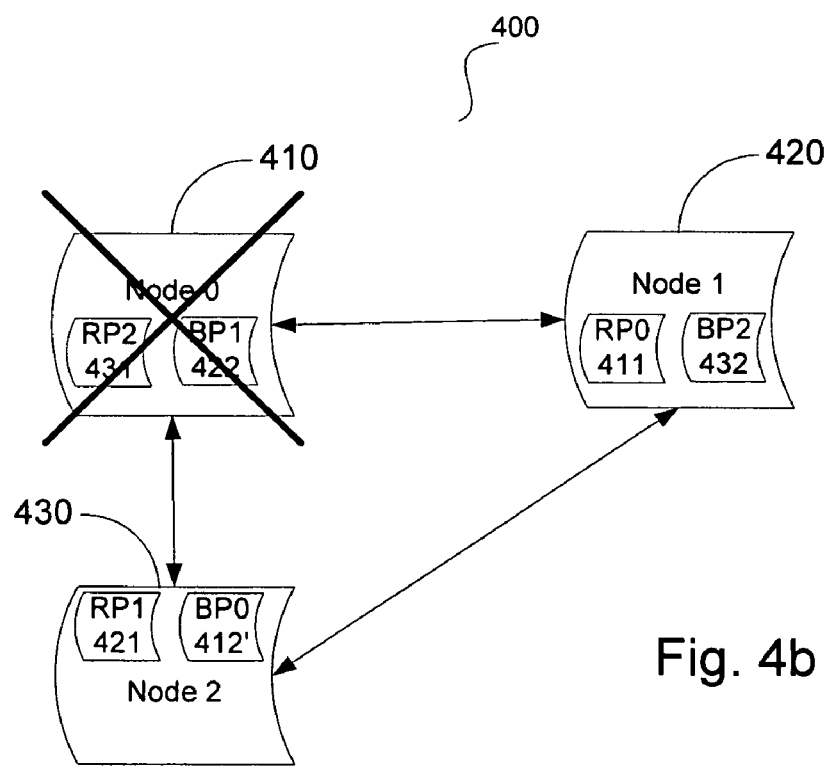
FIG. 4b illustrates the three node system in accordance with an embodiment of the present invention when one node is unavailable.

FIG. 4b illustrates the three-node system 400 when one node is unavailable in accordance with an embodiment of the present invention. When node 0 410 is unavailable due to updating or failure, for example, redundancy takes place at the remaining nodes 1 420 and 2 430. Additionally, nodes 1 420 and 2 430 continue to have at least one redundancy partner during this time. If for some reason data from node 0 410 is mirrored as RP0 411 only to node 1 420, but not mirrored as BP0 412 to node 2 430, mirroring of node 0 data continues at node 1 420 to node 2 430, thereby continuing to create duplicate copies of data originally stored at node 0 410. Thus, as is depicted in FIG. 4b, RP0 411 on node 1 420 is duplicated to node 2 430 as BP0 412'.

Presently available two-node clusters can be extended into multi-node clusters that store data in triplet among at least a quartet of storage nodes. When data on two of the four nodes becomes unavailable, at least one copy of data from each of the quartet of nodes continues to be available.

Figure 5:
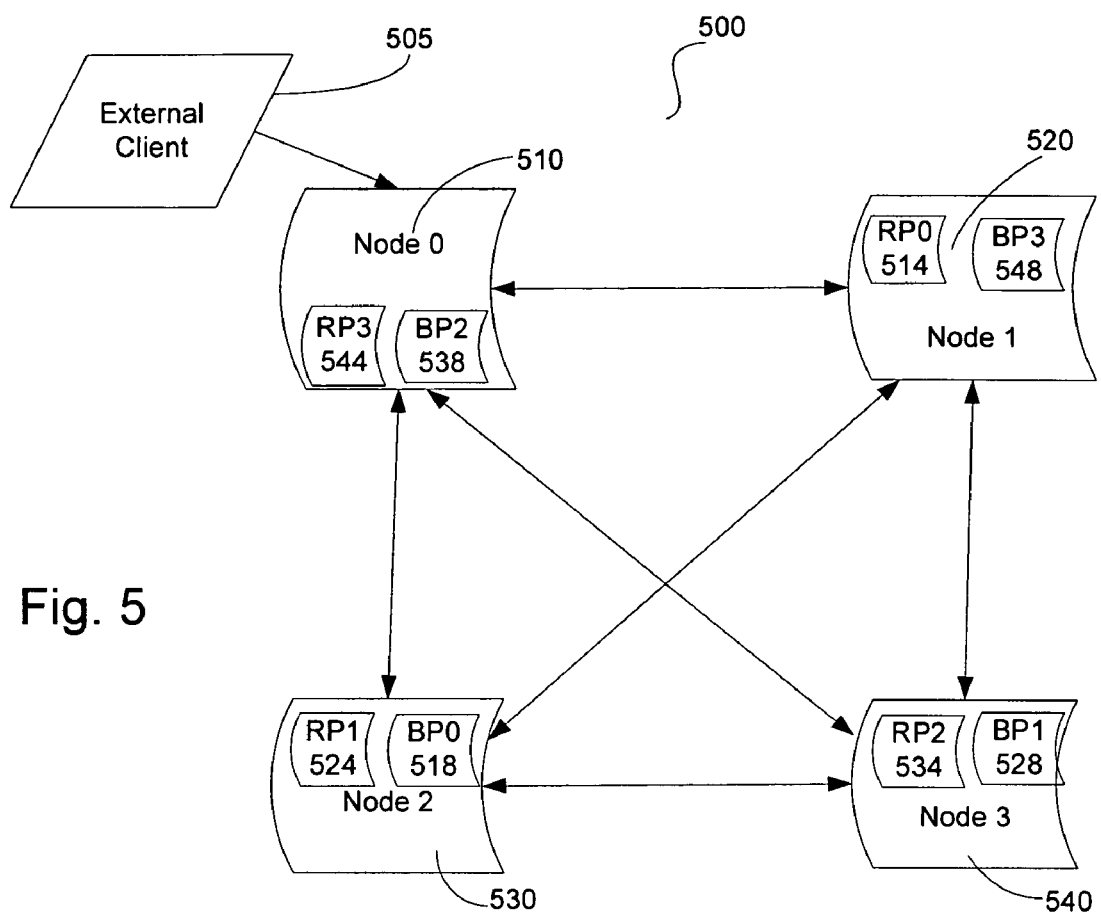
FIG. 5 is a block diagram of a four-node system showing the relationship between nodes 0, 1, 2 and 3 in accordance with an embodiment of the present invention.

FIG. 5 is a block diagram of a four-node system 500 showing the relationship between nodes 0 (510), 1 (520), 2 (530) and 3 (540) in accordance with an embodiment of the present invention. According to this embodiment, node 0 510 is the primary node because external client 505 initially writes data to node 0 510. However, and as described below, any of nodes 0 510, 1 520, 2 530 or 3 540 can serve as a primary node. Data written to node 0 510 is mirrored to nodes 1 520 and 2 530. Node 1 520 serves as the redundancy partner node for node 0 510 and stores RP0 514. Node 2 530 serves as the backup partner node for node 0 510 and stores BP0 518.

Similar to the redundancy found with node 0 510, node 1 520, 2 530 and 3 540 can serve as primary nodes. Each node serving as a primary node has a redundancy partner node. Node 2 530 is the redundancy partner node for node 1 520 and stores mirrored data RP1 524. Node 3 is the redundancy partner node for node 2 530 and stores mirrored data RP2 434. And node 0 510 is the redundancy partner node for node 3 540 and stores mirrored data RP3 544. In addition, nodes 1 520, 2 530, and 3 540 have backup partner nodes containing backup data. Node 3 540 stores mirrored backup data BP1 528 for node 1 520, node 0 stores mirrored backup data BP2 538 for node 2, and node 1 stores mirrored backup data BP3 548 for node 3. In accordance with the present invention, when node system 500 is fully operational the data stored originally on each of the four nodes is stored in triplicate.

When node 0 510 is unavailable, duplicate copies of data originally stored on node 0 continues to be stored on node 1 520 and node 2 530. Upon node 0 failing or being taken offline, for example, the stored information on node 0 510, namely data originally written by an external client 505 referred to as primary data, redundancy partner data RP3 544 from node 3 540 and backup partner data BP2 from node 2 530 is also unavailable. However, for node 0 520, node 2 530 and node 3 540, duplicate copies of data for each node continues to be available. Node 2 530 contains a set of primary data, and node 2 530 duplicate data RP2 534 is stored on redundancy partner node at node 3 540. Similarly, node 3 540 contains a set of primary data, and node 3 540 duplicate data BP3 548 is stored on a backup partner node at node 1 510. Node 1 520 continues to have data stored in triplet on node cluster 500 because neither of its redundancy partner node at node 2 storing RP1 524, nor backup partner node at node 3 storing BP1 528 is unavailable. In a four-node system, storing copies of data in triplicate allows for two nodes to be unavailable while continuing to make available copies of data from each node by way of the available nodes serving as primary, redundancy partner and backup partner nodes.

In accordance with an embodiment of the invention, when a node fails in a system with more than 3 nodes, redundancy relationships can be changed in order to maintain redundancy at two nodes. However such complexity is not required.

In accordance with an embodiment of the invention, a write may be received at a node, which confirms that it is not the primary, redundancy partner or backup partner. In that case, the node would need to forward the request or write the data to the primary node, which would then mirror the data to the redundancy nodes.

In another embodiment of the present invention, a node is not required to serve in a primary, redundancy and backup capacity. For example, nodes can serve as standby nodes that normally do not receive requests. The present invention provides redundancy in code loading, thereby increasing data reliability and can be implemented in storage devices, in computer systems and in software, for example.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for increasing data reliability in a storage system, comprising:
   storing first primary data at a first primary node;
   mirroring a copy of the first primary data to a first redundancy partner node and to a first backup partner node;
   storing second primary data at said first redundancy partner node operating also as a second primary node; and
   mirroring a copy of the second primary data to said first primary node operating also as a second backup partner node, and to said first backup partner node operating also as a second redundancy partner node.

2. The method of claim 1, wherein receiving said first primary data comprises receiving data from a source other than the first redundancy partner node and the first backup partner node and wherein receiving said second primary data comprises receiving data from a source other than the first primary node and the first backup partner node.

3. The method of claim 1, further comprising initiating failover at the first redundancy partner node and the first backup partner node when failure of the first primary data occurs allowing access to mirrored copies of the first primary data.

4. The method of claim 1, further comprising determining the first primary data is unavailable and mirroring of the first primary data has occurred only at a first partner node; and mirroring the first primary data from the first partner node to a second partner node.

5. The method of claim 1, wherein each node has at least one logical unit number (LUN) associated with the node, said storing including writing primary data to a LUN associated with the primary node to which it is being written, said method further comprising identifying a node as a primary node for the primary data to be written by determining the logical unit number (LUN) to which the primary data is to be written.

6. The method of claim 5, wherein identifying a node as a primary node comprises performing a Modulo N operation on the LUN to which the primary data is to be written, wherein the N in the Modulo N operation equals the number of nodes in the storage system.

7. The method of claim 1, further comprising:
   storing third primary data at said first backup partner node operating also as a third primary node; and
   mirroring a copy of the third primary data to said first primary node operating also as a third redundancy partner node, and to said first redundancy partner node operating also as a third backup partner node.

* * * * *